Feb. 21, 1928.                                                                1,660,029
H. W. BELL
SUPPORTING CONNECTION FOR PARTS OF MOTOR VEHICLES
Filed March 4, 1920

Inventor
Harvey W. Bell
By his Attorney
E. W. Marshall

Patented Feb. 21, 1928.

1,660,029

UNITED STATES PATENT OFFICE.

HARVEY W. BELL, OF YONKERS, NEW YORK, ASSIGNOR TO THE BELOYT CORPORATION, OF DOVER, DELAWARE, A CORPORATION OF DELAWARE.

SUPPORTING CONNECTION FOR PARTS OF MOTOR VEHICLES.

Application filed March 4, 1920. Serial No. 363,189.

This invention relates to the supporting of one° part of a motor vehicle upon another by means of a flexible or yielding connection which permits of limited relative movement between the parts without frictional wear.

An important embodiment of the invention consists in the spring suspension of motor vehicles and has for its object to provide a simple, practical, efficient and inexpensive coupling between the vehicle frame or body and the supporting springs therefor, which will have none of the noise and rattle of the shackles ordinarily employed for this purpose and which, while freely flexible in the desired directions, will oppose side sway and other movements which it is desirable to control.

The invention involves certain novel features of construction, combinations and arrangements of parts, as will be disclosed in the course of the following specification.

In the drawing accompanying and forming a part of this specification I have illustrated the invention embodied in but a few of the different forms it may take and wish it understood that the structure may be modified to suit different requirements without departure from the scope of protection afforded in the appended claims.

Figure 1:
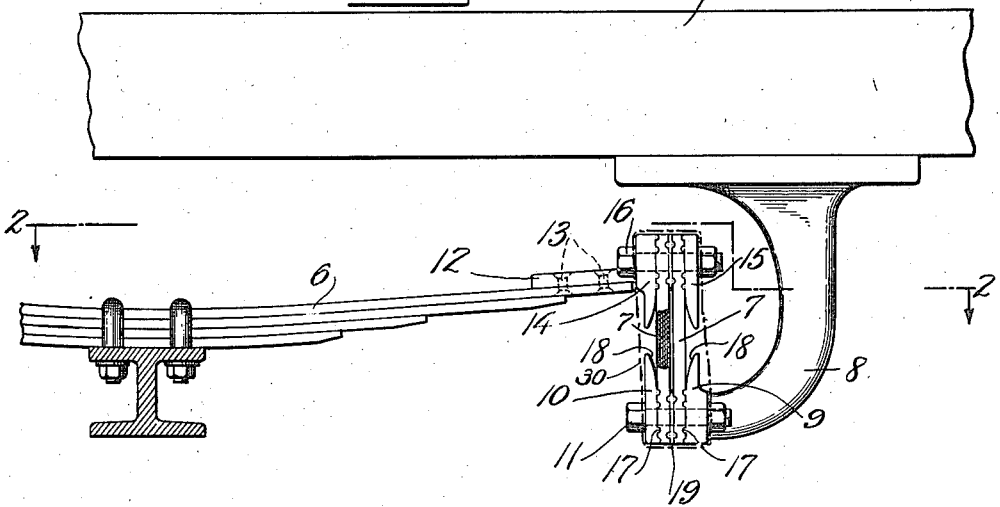
Figure 1 is a broken and partly sectional view showing the invention applied as a coupling between the frame and the front spring of an ordinary motor car.
Figure 2:
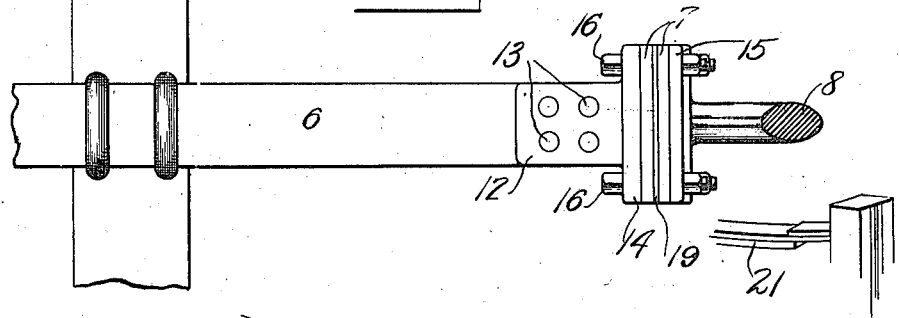
Figure 2 is a plan view as taken on substantially the plane of line 2—2 of Figure 1.

In Figure 1 I have indicated at 5 the forward portion of the body or frame of a motor vehicle and 6 designates a front supporting spring of the semi-elliptic type ordinarily employed.

My improved coupling in its illustrated form comprises one or more substantially flat connecting elments 7 which are practically non-flexible in the direction of their plane but relatively flexible in a direction at right angles to such plane.

The material which I prefer to use for this purpose at the present time consists of built-up layers or laminations of woven fabric arranged with the strands of the several layers disposed in different angular relations, the said laminations being impregnated with rubber or other binding material and being combined under heavy pressure in a single cohesive unit. This material has the necessary tensile strength, is quite freely flexible in a plane transverse to its flat plane and powerfully opposes any twisting or angular strains applied flatwise or in the plane of the material. Suspension links constructed of this or similar material also have the desired attribute of opposing longitudinal compressive forces to a desired extent.

In applying the invention to the particular form of embodiment illustrated in the drawings, the strips which form the suspension links are disposed edgewise with respect to the plane of the force which it is desired to oppose and are rigidly clamped at their opposite ends so as to enable them to oppose effectively such forces which, for instance, might be the so-called "side sway" common in motor vehicles. The suspension links in Figures 1 are shown as arranged transversely of the vehicle for the purpose of resisting side sway, while yielding freely to relative longitudinal displacement between the body and the supporting spring. As shown in the drawing, the unclamped portions of the links are not of greater length than width, and are therefore capable of resisting sidesway very effectively.

The rigid securing devices for the opposite ends of the links consist in the present disclosure of clamps carried by the body and the spring respectively. The body clamp is shown as carried by a bracket 8 dependent from the frame and terminating in substantially flat-faced jaws 9 and 10 between which the lower ends of the links are gripped, the jaw 10 being held in clamping relation to the other or fixed jaw by securing bolts 11. Similarly, the spring clamp is shown in the form of a bracket or base plate 12 secured by rivets or other suitable fastenings 13 to the end of the spring and carrying the relatively fixed and movable jaws 14 and 15 which are secured in clamping relation on the upper end of the links by the bolts 16. These clamping jaws are shown as provided with clamping ridges or ribs 17 on their opposing faces for more firmly gripping the interposed strips.

Abrasion or wearing of the strips at the points of issuance from the holding clamps is prevented in the illustration by providing the clamp jaws with the outwardly curved surfaces 18 at the opposite faces of the strips forming rounded bearings over which the strips can flex without strain.

Where a plurality of links are employed in parallel relation, as indicated in Figure 1, such links may be secured in properly spaced relation by means of interposed washer elements, such as indicated at 19.

The spring carried clamp is illustrated as made with a relatively flat base which can be directly riveted to the main leaf of the spring. This is a particularly important point in that it avoids the necessity for forming the spring leaf with an eye at this end, which operation as well known is a relatively expensive one.

The invention, it will be seen, provides the necessary flexibility or freedom of action in the direction desired and offers effectual opposition to undesired movement and this with an absolute freedom from mechanical joints which work loose and require constant attention in the matter of lubrication, etc.

The invention thus provides for a supporting connection between the body or frame of a motor vehicle and another part thereof, such as a spring, by the use of suitable flexible or yielding material which is so mounted in supporting relationship between the said parts as to be immovable in operation with respect to each part in the area of contact therewith, the flexing or yielding of the material serving to provide for limited movement of the one part with relation to the other.

By virtue of this construction rubbing or frictional wear between the connected parts and between said parts and the yielding material is avoided.

Figure 3:
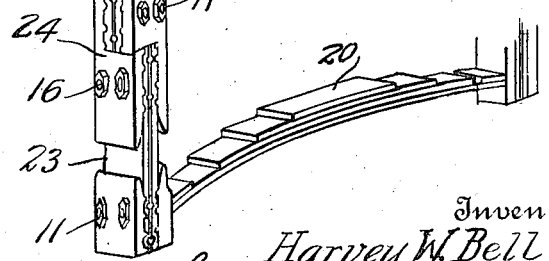
Figure 3 is a view illustrating the application of the invention to the rear "platform" type of spring suspension.

In Figure 3 I have illustrated the invention as applied to a spring suspension of the so-called "platform" type in which the vehicle body is supported at the rear by a transverse spring 20 hung from the ends of longitudinally extending spring 21 at the opposite ends of the axle. With such a type, the links may be of compound construction, involving the transversely and longitudinally disposed link sections 22 and 23 clamped fixedly at opposite ends to the ends of springs 21 and 20 and fixedly connected together at their adjoining ends by the compound clamp 24.

These compound links operate after the manner of the simple links previously described, in that the transverse section opposes side thrust while yielding to longitudinal movement and the longitudinally disposed link section opposes longitudinal movement while yielding to side thrust. This allows for the necessary freedom of spring action with this form of construction.

The supporting members or suspension links and the bearings therefor may be protected from grit and water by providing a cover therefor substantially as indicated at 30 in Figure 1, the same being shown as a "boot" of leather or other flexible material applied over the clamps and entirely covering both the bearing surfaces and the suspension strips. This cover prevents grit from getting on the bearing surfaces which would have a tendency to wear the material of the links.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

What I claim is:

1. A link adapted to connect supporting and supported parts of a vehicle, comprising a relatively flat strip freely flexible in one transverse direction but substantially non-flexible in other directions, and connecting means rigidly secured to the strip at separated points thereof.

2. A link adapted to connect supporting and supported parts of a vehicle, comprising a relatively flat strip strongly resistant to longitudinal compression, and connecting means rigidly secured to the strip at separated points thereof.

3. In a motor vehicle, the combination with the frame of the vehicle, of a part movable with relation to the frame, and means connecting said frame and vehicle part with provision for such relative movement, comprising a flexible, substantially inextensible fabric plate immovably connected at spaced points to the frame and to said vehicle part.

4. A suspension link adapted to connect two supporting parts of a vehicle comprising a strip having greater length and width than thickness, freely flexible in one transverse direction but comparatively stiff in other directions and strongly resistant to longitudinal compression, and separated connecting means rigidly secured to opposite ends of the strip.

5. A link adapted to connect supporting and supported parts of a vehicle comprising a plurality of relatively flat strips, freely flexible in one direction but substantially non-flexible in other directions and strongly resistant to longitudinal compression, and connecting means rigidly secured to the strips at separated points thereof.

6. A link adapted to connect supporting and supported parts of a vehicle comprising strips having greater length and breadth than thickness, freely flexible in one transverse direction but comparatively stiff in other directions, spacing members between the strips near the ends thereof, and brackets at said ends of the strips arranged to rigidly clamp the strips and the spacing members together and to hold the strips in superposed relation.

7. The combination with a vehicle body and a spring, of a flexible link supporting the body on the spring, said link comprising a plurality of plies of substantially inelastic textile fabric of high tensile strength, and means uniting said fabric plies and protecting them from the elements.

8. A suspension link adapted to connect two supporting parts of a vehicle comprising a strip of non-metallic material having greater length and width than thickness, freely flexible in one transverse direction but comparatively stiff in other directions and strongly resistant to longitudinal compression, and separated connecting means rigidly secured to opposite ends of the strip.

9. A suspension link adapted to connect two supporting parts of a vehicle comprising a strip consisting of a unitary impregnated body of fabric laminations having greater length and width than thickness, freely flexible in one transverse direction but comparatively stiff in other directions, and connecting means rigidly secured to opposite ends of the strip.

10. A device for connecting a vehicle part with the frame of the vehicle with provision for a limited freedom of movement between said frame and part, comprising a flexible, substantially inelastic member composed of rubber impregnated fabric, and means for immovably connecting said member to the said frame and to the said part respectively.

11. A link adapted to connect two related parts having a limited relative movement, comprising a strip having greater length and breadth than thickness, freely flexible in one transverse direction but comparatively stiff in other directions, and brackets rigidly clamped to spaced parts of the strip, said brackets being constructed and provided with means for affixing the link to said related parts and holding the strip in desired definite relation thereto.

12. A link adapted to connect two related parts having a limited relative movement, comprising a plurality of strips having greater length and breadth than thickness, freely flexible in one transverse direction but comparatively stiff in other directions, separating members between the strips at spaced parts thereof, and brackets rigidly clamping the strips and separating members together, said brackets being constructed and provided with means for affixing the link to said related parts and to hold the strips in desired definite relation thereto.

13. In combination with a vehicle body and a supporting spring therefor, a suspension link with its ends rigidly connected with the body and with the spring, said link comprising a strip having greater length and breadth than thickness, freely flexible in one transverse direction, but comparatively stiff in all other directions.

14. In combination with a vehicle body and a supporting spring therefor, a suspension link with its ends rigidly connected with the body and with the spring, said link comprising a strip having greater length and breadth than thickness, freely flexible in one transverse direction, but comparatively stiff in other directions and strongly resistant to longitudinal compression.

15. In combination with a vehicle body and a supporting spring therefor, a suspension link with its ends rigidly connected with the body and with said spring, said link comprising a strip of non-metallic material having greater length and breadth than thickness, freely flexible in one transverse direction but relatively stiff in all other directions.

16. In combination with a vehicle body and a supporting spring therefor, a suspension link with its ends rigidly connected with the body and with said spring, said link comprising a strip consisting of a unitary impregnated body of fabric laminations, said link body having greater length and breadth than thickness and being freely flexible in one transverse direction but relatively stiff in all other directions.

17. In a spring suspension for vehicles, an element for connecting the spring with the frame and transmitting the load therebetween, said element comprising a plate of rubberized fabric and means for mounting said plate on said frame and spring with the points of attachment of the fabric to the body located in a line transverse to the direction of the spring.

18. In combination with a vehicle body and a supporting spring therefor, a suspension link comprising a strip having greater length and breadth than thickness, freely flexible in one transverse direction but comparatively stiff in other directions and clamps rigidly connecting the ends of the strip with the body and with the spring, said clamps being provided with curved shoulders adjacent the strip forming bearings over which the strip may flex.

19. A supporting link adapted to connect two related parts having a tendency to move relatively in different directions, said link comprising a strip having greater length and breadth than thickness, freely flexible in one transverse direction, but comparatively stiff in all other directions, said link being affixed to said parts and positioned to resist undesired relative movements thereof.

20. In combination with a vehicle body and a supporting spring therefor, a suspension link with its ends rigidly connected with the body and with the spring, said link comprising a flat strip having greater length and breadth than thickness, freely flexible in one transverse direction, but comparatively stiff in all other directions, said link being disposed with the flat sides of the strip substantially in the plane of the motion which it is desired to resist.

21. In combination with a vehicle body and a supporting spring therefor, a suspension link with its ends rigidly connected with the body and with the spring, said link comprising a strip having greater length and breadth than thickness, freely flexible in one transverse direction, but comparatively stiff in other directions, and a casing extending between the rigidly held ends of the link and covering the intermediate flexible portion thereof.

22. In combination with a vehicle body and a supporting spring therefor, a suspension link comprising a strip having greater length and breadth than thickness, freely flexible in one transverse direction but comparatively stiff in other directions and clamps rigidly connecting the ends of the strip with the body and with the spring, said clamps being provided with bearings over which the strip may flex, and a casing extending between the clamps and covering said bearings and the intermediate flexible portions of the strip.

23. In combination with a vehicle body and a supporting spring therefor, a suspension link with its ends rigidly connected with the body and with the spring, said link comprising a plurality of strips each having greater length and breadth than thickness, freely flexible in one transverse direction, but comparatively stiff in all other directions.

24. In combination with a vehicle body and a supporting spring therefor, a suspension link with its ends rigidly connected with the body and with said spring, said link comprising a plurality of strips of non-metallic material each having greater length and breadth than thickness, freely flexible in one transverse direction but relatively stiff in all other directions.

25. In combination with a vehicle body and a supporting spring therefor, a suspension link comprising a plurality of strips each having greater length and breadth than thickness, freely flexible in one transverse direction but comparatively stiff in other directions, separating members between the strips and clamps rigidly connecting the ends of the strips and the separating members together and with the body and with the spring.

26. In combination, a vehicle frame, a spring, and a shackle connecting said spring with the frame comprising flexible fabric, and means securing the fabric at one point to be immovable at said point with relation to the body and at another point to be immovable at said other point with relation to the spring.

27. In combination, a vehicle frame, a spring, and a piece of fabric for supportably connecting the spring with the frame, the fabric being free to flex about a line parallel to the axle and at right angles to the lengthwise direction of the spring and having separated portions thereof made immovable with relation to the frame and spring respectively.

28. In automobile construction, in combination with the metallic frame of the chassis, the axle and a metallic spring thereon, a flexible inelastic non-metallic strip secured fixedly to the end of the spring and secured fixedly to the frame whereby the frame is suspended from the spring by a non-metallic connection and said connection which is free to flex intermediate its ends is maintained under tension.

29. In automobile construction, in combination with the metallic frame of the chassis, the axle and a metallic spring thereon, a spring bracket secured to the frame, a strip of flexible inelastic non-metallic material secured fixedly at its lower end to the bracket and secured fixedly at its upper end to the end of the spring whereby the frame is suspended from the spring by a non-metallic connection which is free to flex intermediate its ends and said connection is maintained under tension.

30. The combination with a vehicle body and a supporting spring therefor, of a suspension link comprising a flat strip strongly resistant to flexure in the plane of its body but freely flexible transversely of said plane, and means on said spring and vehicle body rigidly clamping the upper and lower ends of said strip, the unclamped length of the strip being no greater than the width thereof, whereby the link is rendered substantially rigid in one horizontal direction.

31. The combination with a vehicle body and a supporting spring therefor, of a suspension link comprising a flat strip strongly resistant to flexure in the plane of its body but freely flexible transversely of said plane, means on said spring and vehicle body rigidly clamping the strip at the upper and lower ends thereof to extend transversely of the vehicle body, the unclamped length of said strip being less than the width thereof whereby the link is rendered substantially rigid transversely of the vehicle body to check side sway.

32. The combination with a vehicle body and a supporting spring therefor, of a suspension link comprising a flat strip strongly resistant to flexure in the plane of its body but freely flexible transversely of said plane, means on said spring and vehicle body rigidly clamping the strip at the upper and lower ends thereof, the unclamped length of said strip being short enough with relation to the width of the strip to render the strip substantially rigid in the direction of its width.

33. In combination, a vehicle frame, a spring and a piece of fabric for supportably connecting the spring with the frame, the plane of the fabric being substantially parallel to the axle so as to prevent sidesway of the body and the fabric being immovably connected to the frame and to the spring.

34. A flexible connecting link comprising a substantially flat strip of material strongly resistant to flexure in the plane of its body but freely flexible transversely of said plane, and means rigidly clamping the ends of said strip, said means being formed for rigid attachment to the objects to be connected by the link, the unclamped length of the strip being less than the width thereof, whereby the link is rendered substantially inflexible in the direction of its width.

35. A strip of material for use in a flexible connecting link, said strip being perforated to be impaled upon and gripped by cooperating connecting and clamping members at its opposite ends, the length and width of said strip being so related that its unclamped length will be less than its width, whereby it will be rendered substantially inflexible in the direction of its width.

36. The combination with a vehicle spring and a body supported thereby, of a shackle immovably connected to the spring and to the body and including flexible fabric arranged to accommodate relative movement of the body and the spring by flexure of the fabric.

37. In a motor vehicle, the combination with a supporting body and a body supported thereby, and movable relatively thereto, of a shackle immovably secured to said bodies for movably connecting them together, said shackle comprising a flexible, substantially inextensible member arranged to accommodate relative movement of the bodies by flexure of the member.

38. In a motor vehicle, the combination with a body and a supporting spring therefor, of means connecting said parts with provision for permitting relative movement of the spring and body without rubbing engagement, comprising flexible material interposed between said parts, and immovably secured with relation to the connected parts.

In witness whereof, I have hereunto set my hand this 28th day of February, 1920.

HARVEY W. BELL.